(12) United States Patent
Murdoch et al.

(10) Patent No.: US 11,509,467 B2
(45) Date of Patent: Nov. 22, 2022

(54) STORY ASSISTED MNEMONIC PHRASE

(71) Applicant: MICROSOFT TECHNOLOGY LICENSING, LLC, Redmond, WA (US)

(72) Inventors: Brandon Murdoch, Reading (GB); Ankur Patel, Sammamish, WA (US); Logan Girvin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 208 days.

(21) Appl. No.: 16/800,465

(22) Filed: Feb. 25, 2020

(65) Prior Publication Data
US 2021/0266162 A1   Aug. 26, 2021

(51) Int. Cl.
G06F 21/00   (2013.01)
H04L 9/08   (2006.01)
(Continued)

(52) U.S. Cl.
CPC .......... H04L 9/0894 (2013.01); G06F 21/32 (2013.01); G10L 17/00 (2013.01); G10L 17/06 (2013.01); H04L 9/0869 (2013.01)

(58) Field of Classification Search
CPC . H04L 9/0894; H04L 9/0869; H04L 2209/38; H04L 9/3239; G06F 21/32;
(Continued)

(56) References Cited

U.S. PATENT DOCUMENTS

| 5,201,000 A | 4/1993 | Matyas et al. |
| 7,334,125 B1 | 2/2008 | Pellacuru |

(Continued)

FOREIGN PATENT DOCUMENTS

| CN | 107480986 A | 12/2017 |
| EP | 0534420 A2 | 3/1993 |
| WO | 2019143584 A1 | 7/2019 |

OTHER PUBLICATIONS

Antonopoulos, Andreasm. , "Mastering Bitcoin-Unlocking Digital Cryptocurrencies", In Publication of O'Reilly Media, Dec. 20, 2014, 298 Pages.

(Continued)

*Primary Examiner* — Jeffrey C Pwu
*Assistant Examiner* — William A Corum, Jr.
(74) *Attorney, Agent, or Firm* — Workman Nydegger

(57) ABSTRACT

Embodiments disclosed herein are related to generating and using a private key recovery seed based on random words extracted from a generated story to recover the private key. An input story is received from a user. The story includes random words and filler words that were previously generated. The number of random words generated is based on an entropy level. The random words included in the story are extracted. This means that the user does not need to enter any random words that are not included in the story to recover the private key. The random words are input into a first key recovery mechanism to thereby generate a private key recovery seed. The private key recovery seed is then input into a second private key recovery mechanism, the second private key recovery mechanism generating a recovered private key upon performing a recovery operation on the private key recovery seed.

20 Claims, 8 Drawing Sheets

(51) Int. Cl.
  *G06F 21/32* (2013.01)
  *G10L 17/00* (2013.01)
  *G10L 17/06* (2013.01)

(58) Field of Classification Search
  CPC ......... G06F 2221/2131; G06F 21/6245; G10L 17/00; G10L 17/06
  See application file for complete search history.

(56) References Cited

U.S. PATENT DOCUMENTS

| | | | |
|---|---|---|---|
| 7,552,469 | B2 | 6/2009 | Diffie et al. |
| 7,610,491 | B1* | 10/2009 | Tsao ................ G06F 21/31 713/184 |
| 8,667,265 | B1 | 3/2014 | Hamlet et al. |
| 9,137,238 | B1* | 9/2015 | Jakobsson .......... G06F 21/46 |
| 2005/0177376 | A1 | 8/2005 | Cooper et al. |
| 2007/0245149 | A1 | 10/2007 | Lin |
| 2007/0300076 | A1* | 12/2007 | Diffie ............... G06F 21/46 713/184 |
| 2010/0142713 | A1 | 6/2010 | Perlman |
| 2011/0002461 | A1 | 1/2011 | Erhart et al. |
| 2013/0067229 | A1 | 3/2013 | German et al. |
| 2016/0191241 | A1* | 6/2016 | Allen ................ H04L 9/0891 713/158 |
| 2017/0317824 | A1* | 11/2017 | Brown .............. H04L 9/0894 |
| 2019/0036692 | A1* | 1/2019 | Sundaresan ......... H04L 9/0894 |
| 2019/0089546 | A1 | 3/2019 | Garcia Morchon et al. |
| 2019/0228406 | A1* | 7/2019 | Patel ................ H04L 9/0869 |
| 2019/0229909 | A1* | 7/2019 | Patel ................ G06Q 20/3821 |
| 2019/0245688 | A1* | 8/2019 | Patin ................ H04L 9/0869 |
| 2020/0280440 | A1* | 9/2020 | Bollen .............. G06Q 20/382 |
| 2021/0211287 | A1* | 7/2021 | Roy ................ H04L 9/3213 |
| 2021/0398134 | A1* | 12/2021 | Dumas .............. H04L 9/50 |

OTHER PUBLICATIONS

"International Search Report and Written Opinion Issued in PCT Application No. PCT/US21/014415", dated Mar. 24, 2021, 12 Pages.

"Non Final Office Action Issued in U.S. Appl. No. 15/994,334", dated Jan. 3, 2022, 12 Pages.

"International Search Report & Written Opinion Issued in PCT Application No. PCT/US19/013562", dated Apr. 16, 2019, 12 Pages.

"Notice of Allowance Issued in U.S. Appl. No. 15/994,334", dated Aug. 25, 2022, 17 Pages.

* cited by examiner

STORY ASSISTED MNEMONIC PHRASE

BACKGROUND

Most of currently used documents or records that prove identity are issued by centralized organizations, such as governments, schools, employers, or other service centers or regulatory organizations. These organizations often maintain every member's identity in a centralized identity management system. A centralized identity management system is a centralized information system used for organizations to manage the issued identities, their authentication, authorization, roles and privileges. Centralized identity management systems have been deemed as secure since they often use professionally maintained hardware and software. Typically, the identity issuing organization sets the terms and requirements for registering people with the organization. Finally, when a party needs to verify another party's identity, the verifying party often needs to go through the centralized identity management system to obtain information verifying and/or authenticating the other party's identity.

Decentralized Identifiers (DIDs) are a new type of identifier, which are independent from any centralized registry, identity provider, or certificate authority. Distributed ledger technology (such as blockchain) provides the opportunity for using fully decentralized identifiers. Distributed ledger technology uses globally distributed ledgers to record transactions between two or more parties in a verifiable way. Once a transaction is recorded, the data in the section of ledger cannot be altered retroactively without the alteration of all subsequent sections of ledger, which provides a fairly secure platform. In a broader sense, a DID further includes a DID method specifying how a client registers, replaces, rotates, and/or recovers a key. The DID method also sets a key expiration date.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Existing technologies allow for the creation of private and public keys to help encrypt and decrypt sensitive information. For example, in the context of Decentralized Identifiers (DIDs), the private and public key can be used to generate and process verifiable claims (which are statements about a subject that are encrypted with one of the keys). The private key in particular stays under the control the DID owner and allows him or her to create a DID document and to add devices and users that are permitted to access the DID document. The private key also allows for the creation of many different private keys as circumstances warrant.

It is possible, however, that the DID owner may somehow lose the private key or at least lose control of the private key. For example, the storage unit where the DID owner has stored the private key may be destroyed or lost. Alternatively, the private key may be corrupted or become unusable for various reasons. As will be appreciated, if the private key remains lost or unusable, the DID owner may not be able to use his or her DID or access any information related to the DID.

In order to solve some of these problems, various private key recovery mechanisms have been developed that are performed when the private key is first generated. In one mechanism, various random or unrelated words in the language understandable by the DID owner are selected, typically from a known list of words. The words are then mapped to various sequence of bits such that random words represent the sequence of bits. To recover the private key, the random words can be entered into the private key recovery mechanism. Based on the mapping between the random words and the sequence of bits, a private key recovery seed can be generated. The private key recovery seed is input into the recovery mechanism or a different mechanism, which results in the recovery of the private key.

While use of the random or unrelated words is helpful as the DID owner does not need to remember the sequence of bits, it can still be problematic for the DID owner. For example, since the random words are unrelated to each other in any meaningful way, it is often hard to remember them, especially as in many cases there may be 12 or 24 words. This often requires the DID owner to write down the random words in a storage for access when needed. However, it is possible that a hostile third party may gain access to the random words, in which case the hostile third party could use the random words to generate a private key that could be used for malicious purposes. Further, even if a third party does not gain access there is the risk that the storage may be destroyed and thus the random words lost with them. In such case, the DID owner would not be able to recover the private key if needed.

The principles described herein aim to solve at least some of the above-mentioned problems by generating a private key recovery seed based on random words extracted from a generated story and for using the private key recovery seed to recover the private key. The generated story thus connects or relates the random words in a meaningful way that should be easy for the DID owner to memorize. That is, rather than memorizing a number of unrelated random words, the story connects the random words in a way that can be memorized. The DID owner then only needs to enter the story into the recovery mechanism. The recovery mechanism is able to extract the random words from the story, generate the private key recovery seed, and then recover the private key. Advantageously, the DID owner does not need to write down the random words as he or she can memorize the story. If a backup is desired, the story can be written down and stored. If the hostile third party gains access to the story, the hostile third party would not likely know that the story was for use in recovering the private key. At the very least, the hostile third party would not be able to determine from simply reading the story which words of the story are the mapped random words needed for recovering the private key and which words of the story are merely filler words used for connecting the random words in a meaningful way in the story. Accordingly, the principles described herein provide a technical advance as the principles allow for the recovery of a private key while providing enhanced security against the theft, loss, or hostile misuse of the mapped random words needed for recovering the private key.

In one embodiment, an input story is received from a user. The story includes random words and filler words that were previously generated by the computing system. The number of random words generated is based on an entropy level indicated by the user. The random words that are included in the story are extracted. This means that the user does not need to enter any random words that are not included in the story to recover the private key. The random words are input into a first key recovery mechanism for recovering the private key to thereby generate a private key recovery seed. The private key recovery seed is then input into a second private key recovery mechanism, the second private key recovery mechanism generating a recovered private key upon performing a recovery operation on the private key recovery seed.

Another embodiment solves the problems discussed above by generating a story including random words that can be used to generate a private key recovery seed that is useable to recover a private key. In the embodiment, a user input is received that selects a level of entropy for a private key recovery process. Random words are generated based on the selected level of entropy. Filler words are generated that are separate from the plurality of specific random words. Finally, a story is generated that uses the plurality of specific random words and the plurality of filler words in a manner that connects the plurality of specific random words in a form that understandable by the user. In the embodiment, the random words are generated by generating a sequence of random bits that are indicative of the selected level of entropy, dividing the sequence of random bits into segments, and mapping each of the specific random words with a specific segment.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope. Embodiments will be described and explained with additional specificity and details through the use of the accompanying drawings in which.

DETAILED DESCRIPTION

Figure 1:
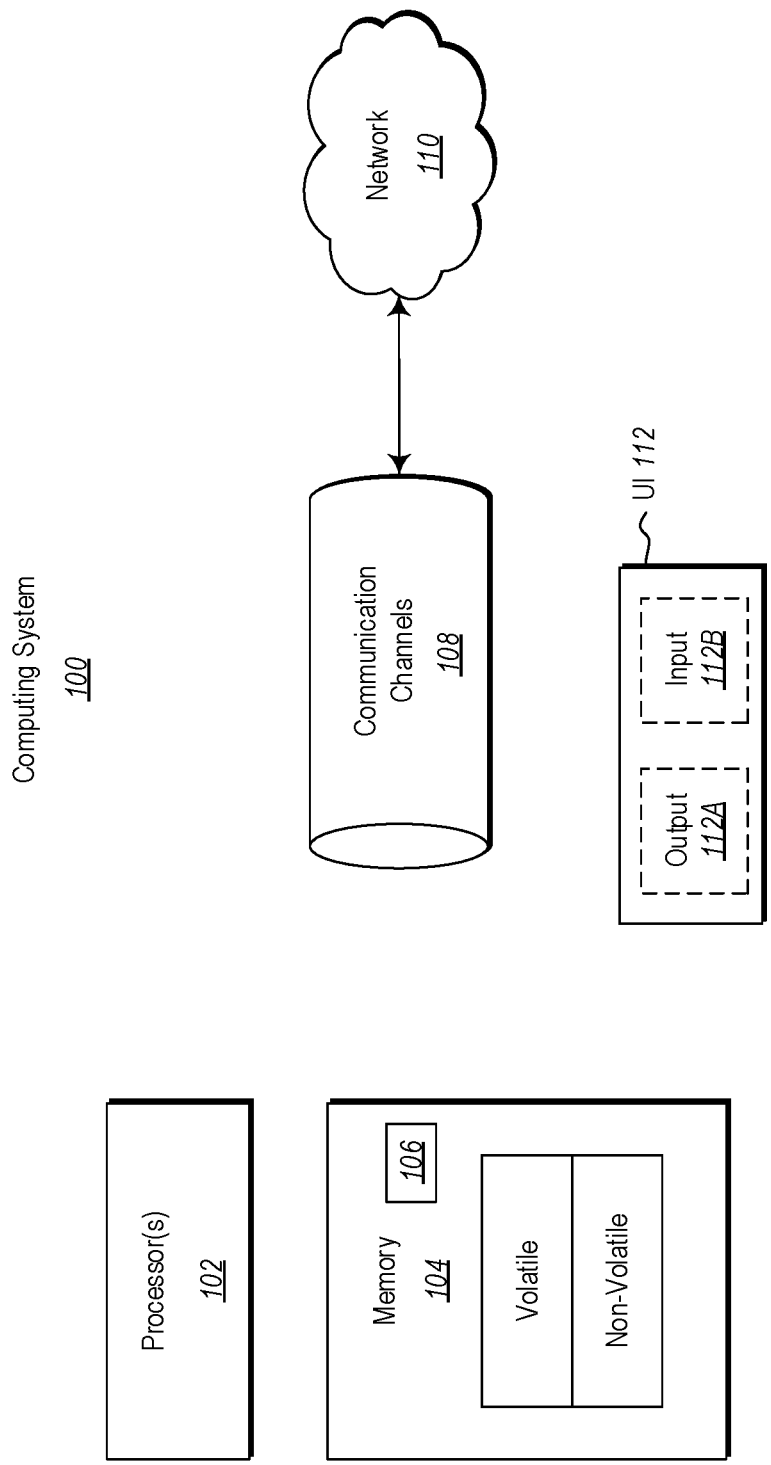
FIG. 1 illustrates an example computing system in which the principles described herein may be employed.

Embodiments disclosed herein are related to computing systems and methods for generating a private key recovery seed based on random words extracted from a generated story and for using the private key recovery seed to recover the private key. In one embodiment, an input story is received from a user. The story includes random words and filler words that were previously generated by the computing system. The number of random words generated is based on an entropy level indicated by the user. The random words that are included in the story are extracted. This means that the user does not need to enter any random words that are not included in the story to recover the private key. The random words are input into a first key recovery mechanism for recovering the private key to thereby generate a private key recovery seed. The private key recovery seed is then input into a second private key recovery mechanism, the second private key recovery mechanism generating a recovered private key upon performing a recovery operation on the private key recovery seed.

Embodiments disclosed herein are also related to computing systems and methods for generating a story including random words that can be used to generate a private key recovery seed that is useable to recover a private key. In the embodiment, a user input is received that selects a level of entropy for a private key recovery process. Random words are generated based on the selected level of entropy. Filler words are generated that are separate from the plurality of specific random words. Finally, a story is generated that uses the plurality of specific random words and the plurality of filler words in a manner that connects the plurality of specific random words in a form that understandable by the user. In the embodiment, the random words are generated by generating a sequence of random bits that are indicative of the selected level of entropy, dividing the sequence of random bits into segments, and mapping each of the specific random words with a specific segment.

Because the principles described herein may be performed in the context of a computing system, some introductory discussion of a computing system will be described with respect to FIG. 1. Then, this description will return to the principles of a decentralized identifier (DID) platform with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The processing unit 102 includes a general-purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" is also used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component includes software objects, routines, methods, and so forth, that are executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure is computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions are embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) are stored in the memory 104 of the computing system 100. Computing system 100 also contains communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 includes output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, virtual or augmented reality, holograms and so forth. Examples of input mechanisms 112B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures discuss various computing system which correspond to the computing system 100 previously described. The computing systems of the remaining figures include various components or functional blocks that implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant.

Figure 2:
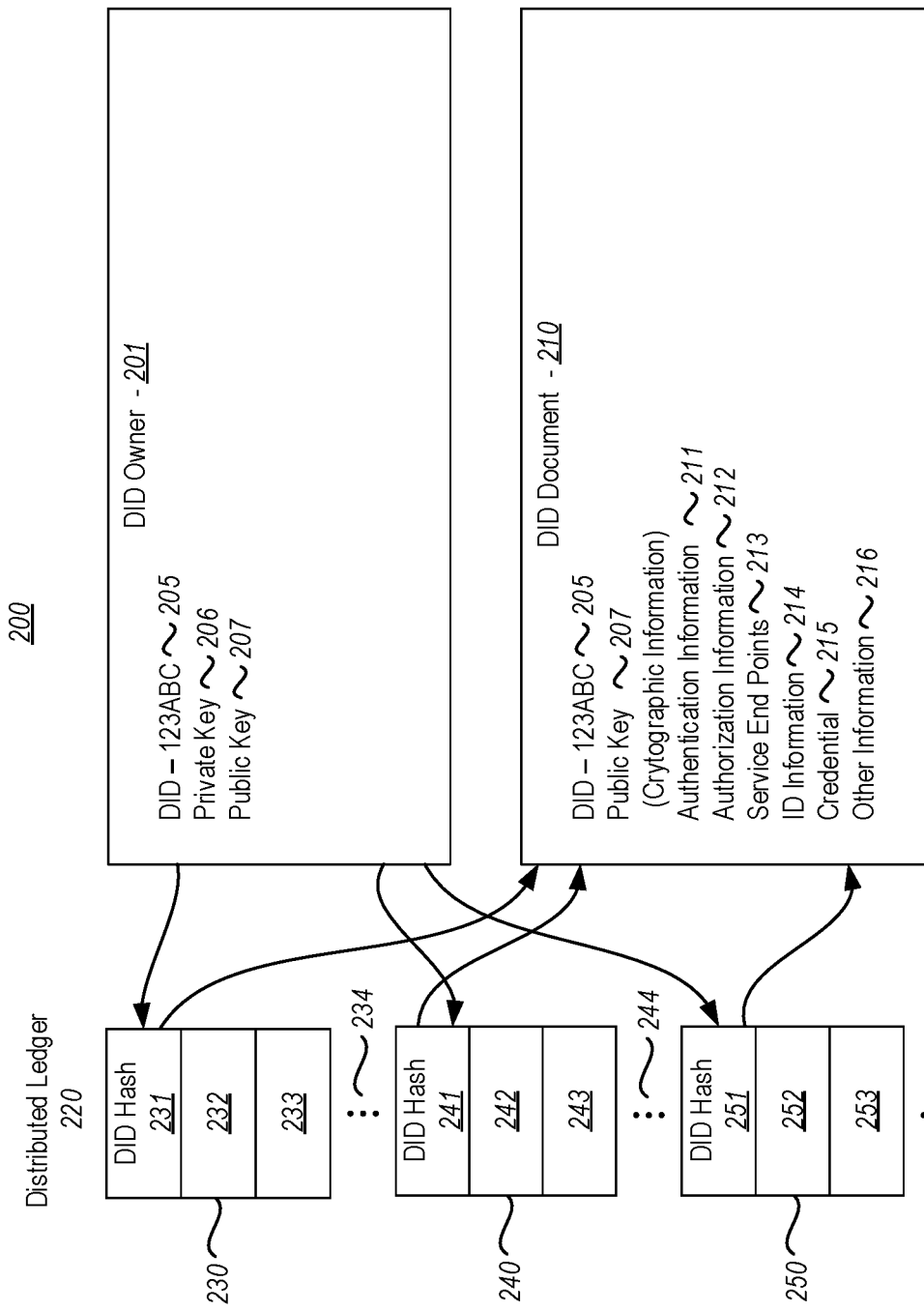
FIG. 2 illustrates an example environment for creating a decentralized identification (DID)

Some introductory discussion of a decentralized identifier (DID) and the environment in which they are created and reside will now be given with respect to FIG. 2, which illustrates portions of a decentralized network 200. As illustrated in FIG. 2, a DID owner 201 owns or otherwise controls a DID 205 that represents an identity of the DID owner 201. The DID owner 201 registers a DID using a creation and registration service, which will be explained in more detail below.

The DID owner 201 is any entity that could benefit from a DID. For example, the DID owner 201 may be a human being or an organization of human beings. Such organizations might include a company, department, government, agency, or any other organization or group of organizations. Each individual human being might have a DID while the organization(s) to which each belongs might likewise have a DID.

The DID owner 201 may alternatively be a machine, system, or device, or a collection of machines, devices and/or systems. In still other embodiments, the DID owner 201 may be a subpart of a machine, system or device. For instance, a device could be a printed circuit board, where the subparts of that circuit board are individual components of the circuit board. In such embodiments, the machine or device may have a DID and each subpart may also have a DID. A DID owner might also be a software component such as the executable component 106 described above with respect to FIG. 1. An example of a complex executable component 106 is an artificial intelligence. Accordingly, an artificial intelligence may also own a DID.

Thus, the DID owner 201 is any entity, human or non-human, that is capable of creating the DID 205 or at least having the DID 205 created for and/or associated with them. Although the DID owner 201 is shown as having a single DID 205, this need not be the case as there may be any number of DIDs associated with the DID owner 201 as circumstances warrant.

As mentioned, the DID owner 201 creates and registers the DID 205. The DID 205 is any identifier that is associated with the DID owner 201. Preferably, that identifier is unique to that DID owner 201, at least within a scope in which the DID is anticipated to be in use. As an example, the identifier is a locally unique identifier, and perhaps more desirably a globally unique identifier for identity systems anticipated to operate globally. In some embodiments, the DID 205 is a Uniform Resource identifier (URI) (such as a Uniform Resource Locator (URL)) or other pointer that relates the DID owner 201 to mechanisms to engage in trustable interactions with the DID owner 201.

The DID 205 is "decentralized" because it does not require a centralized, third-party management system for generation, management, or use. Accordingly, the DID 205 remains under the control of the DID owner 201. This is different from conventional centralized IDs which base trust on centralized authorities and that remain under control of corporate directory services, certificate authorities, domain name registries, or other centralized authority (referred to collectively as "centralized authorities" herein). Accordingly, the DID 205 is any identifier that is under the control of the DID owner 201 and that is independent of any centralized authority.

In some embodiments, the structure of the DID 205 is as simple as a username or some other human-understandable term. However, in other embodiments, for increased security, the DID 205 is preferably a random string of numbers and letters. In one embodiment, the DID 205 is a string of 128 numbers and letters. Accordingly, the embodiments disclosed herein are not dependent on any specific implementation of the DID 205. In a very simple example, the DID 205 is shown within the figures as "123ABC".

As also shown in FIG. 2, the DID owner 201 has control of a private key 206 and public key 207 pair that is associated with the DID 205. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair are generated on a device controlled by the DID owner 201. The private key 206 and public key 207 pair should not be generated on a server controlled by any centralized authority as this causes the private key 206 and public key 207 pair to not be fully under the control of the DID owner 201 at all times. Although FIG. 2 and this description have described a private and public key pair, it will also be noted that other types of reasonable cryptographic information and/or mechanisms are also be used as circumstances warrant.

FIG. 2 also illustrates a DID document 210 that is associated with the DID 205. As will be explained in more detail to follow, the DID document 210 is generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 is implemented according to methods specified by a distributed ledger 220 (such as blockchain) that will be used to store a representation of the DID 205 as will be explained in more detail to follow. Thus, the DID document 210 has different methods depending on the specific distributed ledger.

The DID document 210 also includes the public key 207 created by the DID owner 201 or some other equivalent cryptographic information. The public key 207 is used by third-party entities that are given permission by the DID owner 201 to access information and data owned by the DID owner 201. The public key 207 is also used to verify that the DID owner 201 in fact owns or controls the DID 205.

The DID document 210 includes authentication information 211. The authentication information 211 specifies one or more mechanisms by which the DID owner 201 is able to prove that the DID owner 201 owns the DID 205. In other words, the mechanisms of the authentication information 211 show proof of a binding between the DID 205 (and thus its DID owner 201) and the DID document 210. In one embodiment, the authentication information 211 specifies that the public key 207 be used in a signature operation to prove the ownership of the DID 205. Alternatively, or in addition, the authentication information 211 specifies that the public key 207 be used in a biometric operation to prove ownership of the DID 205. Accordingly, the authentication information 211 includes any number of mechanisms by which the DID owner 201 is able to prove that the DID owner 201 owns the DID 205.

The DID document 210 also includes authorization information 212. The authorization information 212 allows the DID owner 201 to authorize third-party entities the rights to modify the DID document 210 or some part of the document without giving the third-party the right to prove ownership of the DID 205. For example, the authorization information 212 allows the third-party entity to update any designated set of one or more fields in the DID document 210 using any designated update mechanism. Alternatively, the authorization information allows the third-party to limit the usages of DID 205 by the DID owner 201 for a specified time period. This is useful when the DID owner 201 is a minor child and the third-party is a parent or guardian of the child. The authorization information 212 allows the parent or guardian to limit use of the DID owner 201 until such time as the child is no longer a minor.

The authorization information 212 also specifies one or more mechanisms that the third-party will need to follow to prove they are authorized to modify the DID document 210. In some embodiments, these mechanisms are similar to those discussed previously with respect to the authentication information 211.

The DID document 210 also includes one or more service endpoints 213. A service endpoint includes a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers are used by the DID owner 201 or by third-party entities to access the services that operate on behalf of the DID owner 201. Specific examples of service endpoints 213 will be explained in more detail to follow.

The DID document 210 further includes identification information 214. The identification information 214 includes personally identifiable information such as the name, address, occupation, family members, age, hobbies, interests, or the like of DID owner 201. Accordingly, the identification information 214 listed in the DID document 210 represents a different persona of the DID owner 201 for different purposes.

A persona may be pseudo anonymous. As an example, the DID owner 201 may include a pen name in the DID document when identifying him or her as a writer posting articles on a blog. A persona may be fully anonymous. As an example, the DID owner 201 may only want to disclose his or her job title or other background data (e.g., a schoolteacher, an FBI agent, an adult older than 21 years old, etc.) but not his or her name in the DID document. As yet another example, a persona may be specific to who the DID owner 201 is as an individual. As an example, the DID owner 201 may include information identifying him or her as a volunteer for a particular charity organization, an employee of a particular corporation, an award winner of a particular award, and so forth.

The DID document 210 also includes attestation information 215. The attestation information 215 is any information that is associated with the DID owner 201's background. For instance, the attestation information 215 is (but not limited to) a qualification, an achievement, a government ID, a government right such as a passport or a driver's license, a payment provider or bank account, a university degree or other educational history, employment status and history, or any other information about the DID owner 201's background. In some embodiments, the DID owner 201 collects various signed attestations (also sometimes referred as verifiable claims) that are included in the attestation information from different third-party entities.

The DID document 210 includes various other information 216. In some embodiments, the other information 216 includes metadata specifying when the DID document 210 was created and/or when it was last modified. In other embodiments, the other information 216 includes cryptographic proofs of the integrity of the DID document 210. In still further embodiments, the other information 216 includes additional information that is either specified by the specific method implementing the DID document or desired by the DID owner 201.

FIG. 2 also illustrates a distributed ledger 220. The distributed ledger 220 is any decentralized, distributed network that includes various computing systems that are in communication with each other. For example, the distributed ledger 220 includes a first distributed computing system 230, a second distributed computing system 240, a third distributed computing system 250, and any number of additional distributed computing systems as illustrated by the ellipses 260. The distributed ledger 220 operates according to known standards or methods for distributed ledgers. Examples of conventional distributed ledgers that correspond to the distributed ledger 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 is stored on the actual distributed ledger. Alternatively, in other embodiments the DID document 210 is stored in a data storage (not illustrated) that is associated with the distributed ledger 220.

As mentioned, a representation of the DID 205 is stored on each distributed computing system of the distributed ledger 220. For example, in FIG. 2 this is shown as DID hash 231, DID hash 241, and DID hash 251, which are ideally identical hashed copies of the same DID. The DID hash 231, DID hash 241, and DID hash 251 point to the location of the DID document 210. The distributed ledger or blockchain 220 also stores numerous other representations of other DIDs as illustrated by references 232, 233, 234, 242, 243, 244, 252, 253, and 254.

In one embodiment, when the DID owner 201 creates the DID 205 and the associated DID document 210, the DID hash 231, DID hash 241, and DID hash 251 are written to the distributed ledger 220. The distributed ledger 220 thus records that the DID 205 now exists. Since the distributed ledger 220 is decentralized, the DID 205 is not under the control of any entity outside of the DID owner 201. DID hash 231, DID hash 241, and DID hash 251 each include, in addition to the pointer to the DID document 210, a record or time stamp that specifies when the DID 205 was created. At a later date, when modifications are made to the DID document 210, each modification (and potentially also a timestamp of the modification) is also recorded in DID hash 231, DID hash 241, and DID hash 251. DID hash 231, DID hash 241, and DID hash 251 further include a copy of the public key 207 so that the DID 205 is cryptographically bound to the DID document 210.

Figure 3:
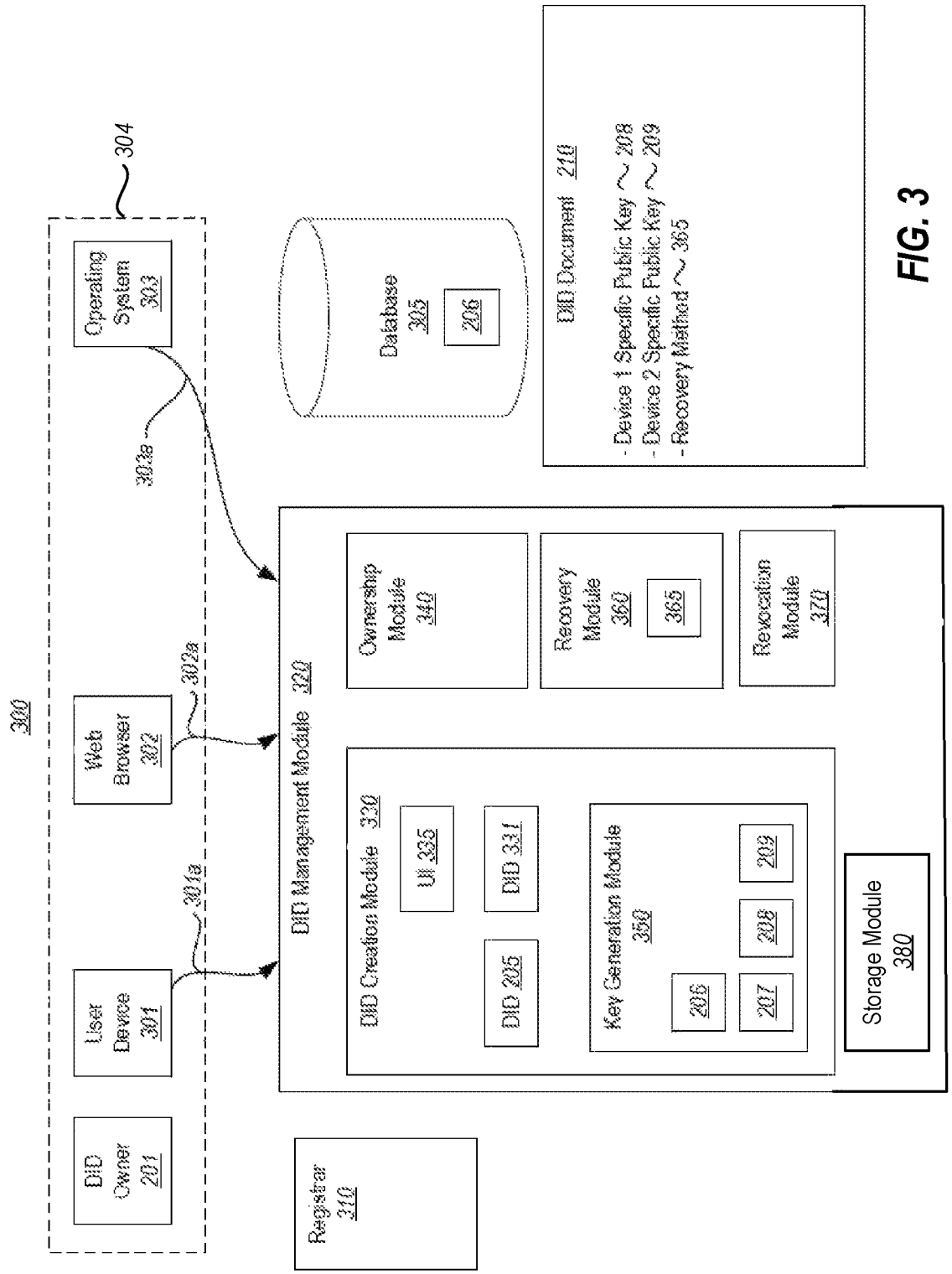
FIG. 3 illustrates an example environment for various DID management operations and services.

Having described DIDs and how they operate generally with reference to FIG. 2, specific embodiments of DID environments will now be explained. Turning to FIG. 3, a computing system environment 300 that is used to perform various DID management operations and services will now be explained. It will be appreciated that the environment of FIG. 3 reference elements from FIG. 2 as needed for ease of explanation.

As shown in FIG. 3, the environment 300 includes various devices and computing systems that are owned or otherwise under the control of the DID owner 201. These include a user device 301. The user device 301 is, but is not limited to, a mobile device such as a smart phone, a computing device such as a laptop computer, or any device such as a car or an appliance that includes computing abilities. The device 301 includes a web browser 302 operating on the device and an operating system 303 operating the device. More broadly speaking, the dashed line 304 represents that all of these devices are owned or otherwise under the control of the DID owner 201.

The environment 300 also includes a DID management module 320. It will be noted that in operation, the DID management module 320 resides on and is executed by one or more of user device 301, web browser 302, and the operating system 303 as illustrated by respective lines 301a, 302a, and 303a. Accordingly, the DID management module 320 is shown as being separate for ease of explanation. In some embodiments, the management module 320 is referred to as a "digital wallet" or a "user agent".

As shown in FIG. 3, the DID management module 320 includes a DID creation module 330. The DID creation module 330 is used by the DID owner 201 to create the DID 205 or any number of additional DIDs, such as DID 331. In one embodiment, the DID creation module includes or otherwise has access to a User Interface (UI) element 335 that guides the DID owner 201 in creating the DID 205. The DID creation module 330 has one or more drivers that are configured to work with specific distributed ledgers such as distributed ledger 220 so that the DID 205 complies with the underlying methods of that distributed ledger.

A specific embodiment will now be described. For example, the UI 335 prompt for the user to enter a username or some other human recognizable name. This name is used as a display name for the DID 205 that will be generated. As previously described, the DID 205 is a long string of random numbers and letters and so having a human-recognizable name for a display name is advantageous. The DID creation module 330 then generates the DID 205. In the embodiments having the UI 335, the DID 205 is shown in a listing of identities and is associated with the human-recognizable name.

The DID creation module 330 also included a key generation module 350. The key generation module generates the private key 206 and public key 207 pair previously described. The DID creation module 330 uses the DID 205 and the private and public key pair to generate the DID document 210.

In operation, the DID creation module 330 accesses a registrar 310 that is configured to the specific distributed ledger that will be recording the transactions related to the DID 205. The DID creation module 330 uses the registrar 310 to record DID hash 231, DID hash 241, and DID hash 251 in the distributed ledger in the manner previously described, and to store the DID document 210 in the manner previously described. This process uses the public key 207 in the hash generation.

In some embodiments, the DID management module 320 includes an ownership module 340. The ownership module 340 provides mechanisms that ensure that the DID owner 201 is in sole control of the DID 205. In this way, the provider of the DID management module 320 is able to ensure that the provider does not control the DID 205 but is only providing the management services.

As previously discussed, the key generation module 350 generates the private key 206 and public key 207 pair and the public key 207 is then recorded in the DID document 210. Accordingly, the public key 207 is usable by all devices associated with the DID owner 201 and all third parties that desire to provide services to the DID owner 201. Accordingly, when the DID owner 201 desires to associate a new device with the DID 205, the DID owner 201 executes the DID creation module 330 on the new device. The DID creation module 330 then uses the registrar 310 to update the DID document 210 to reflect that the new device is now associated with the DID 205, which update would be reflected in a transaction on the distributed ledger 220, as previously described.

In some embodiments, however, it is advantageous to have a public key per device 301 owned by the DID owner 201 as this allows the DID owner 201 to sign with the device-specific public key without having to access a general public key. In other words, since the DID owner 201 will use different devices at different times (for example using a mobile phone in one instance and then using a laptop computer in another instance), it is advantageous to have a key associated with each device to provide efficiencies in signing using the keys. Accordingly, in such embodiments the key generation module 350 generates additional public keys 208 and 209 when the additional devices execute the DID creation module 330. These additional public keys are associated with the private key 206 or in some instances are paired with a new private key.

In those embodiments where the additional public keys 208 and 209 are associated with different devices, the additional public keys 208 and 209 are recorded in the DID document 210 as being associated with those devices. This is shown in FIG. 3. It will be appreciated that the DID document 210 often includes the information (information 205, 207 and 211 through 216) previously described in relation to FIG. 2 in addition to the information (information 208, 209 and 365) shown in FIG. 3. If the DID document 210 existed prior to the device-specific public keys being generated, then the DID document 210 would be updated by the creation module 330 via the registrar 310 and this would be reflected in an updated transaction on the distributed ledger 220.

In some embodiments, the DID owner 201 often desires to keep secret the association of a device with a public key or the association of a device with the DID 205. Accordingly, the DID creation module 330 causes that such data be secretly shown in the DID document 210.

As described thus far, the DID 205 has been associated with all the devices under the control of the DID owner 201, even when the devices have their own public keys. However, in some embodiments it may be useful for each device or some subset of devices under the control of the DID owner 201 to each have their own DID. Thus, in some embodiments the DID creation module 330 generates an additional DID, for example DID 331, for each device. The DID creation module 330 then generates private and public key pairs and DID documents for each of the devices and has them recorded on the distributed ledger 220 in the manner previously described. Such embodiments are advantageous for devices that change ownership as it is possible to associate the device-specific DID to the new owner of the device by granting the new owner authorization rights in the DID document and revoking such rights from the old owner.

As mentioned, to ensure that the private key 206 is totally in the control of the DID owner 201, the private key 206 is created on the user device 301, browser 302, or operating system 303 that is owned or controlled by the DID owner 201 that executed the DID management module 320. In this way, there is little chance that of a third-party (and most consequentially, the provider of the DID management module 320) gaining control of the private key 206.

However, there is a chance that the device storing the private key 206 is lost by the DID owner 201, which causes the DID owner 201 to lose access to the DID 205. Accordingly, in some embodiments, the UI 335 includes the option to allow the DID owner 201 to export the private key 206 to an off device secured database 305 that is under the control of the DID owner 201. As an example, the database 305 is one of the identity hubs 410 described below with respect to FIG. 4. A storage module 380 is configured to store data (such as the private key 206 or the attestation information 215 made by or about the DID owner 201) off device in the database 305 or in the identity hubs 410 that will be described in more detail to follow. Of course, in some embodiments the storage module 380 stores at least some data on the device if the device has sufficient storage resources. In some embodiments, the private key 206 is stored as a QR code that is scanned by the DID owner 201.

In other embodiments, the DID management module 320 includes a recovery module 360 that is used to recover a lost private key 206. In operation, the recovery module 360 allows the DID owner 201 to select one or more recovery mechanisms 365 at the time the DID 205 is created that are later used to recover the lost private key. In those embodiments having the UI 335, the UI 335 allows the DID owner 201 to provide information that will be used by the one or more recovery mechanisms 365 during recovery. The recovery module 360 run on any device associated with the DID 205.

The DID management module 320 also included a revocation module 370 that is used to revoke or sever a device from the DID 205. In operation, the revocation module uses the UI element 335, which allows the DID owner 201 to indicate a desire to remove a device from being associated with the DID 205. In one embodiment, the revocation module 370 accesses the DID document 210 and causes all references to the device to be removed from the DID document 210. Alternatively, the public key for the device is removed. This change in the DID document 210 is then reflected as an updated transaction on the distributed ledger 220 as previously described.

Figure 4:
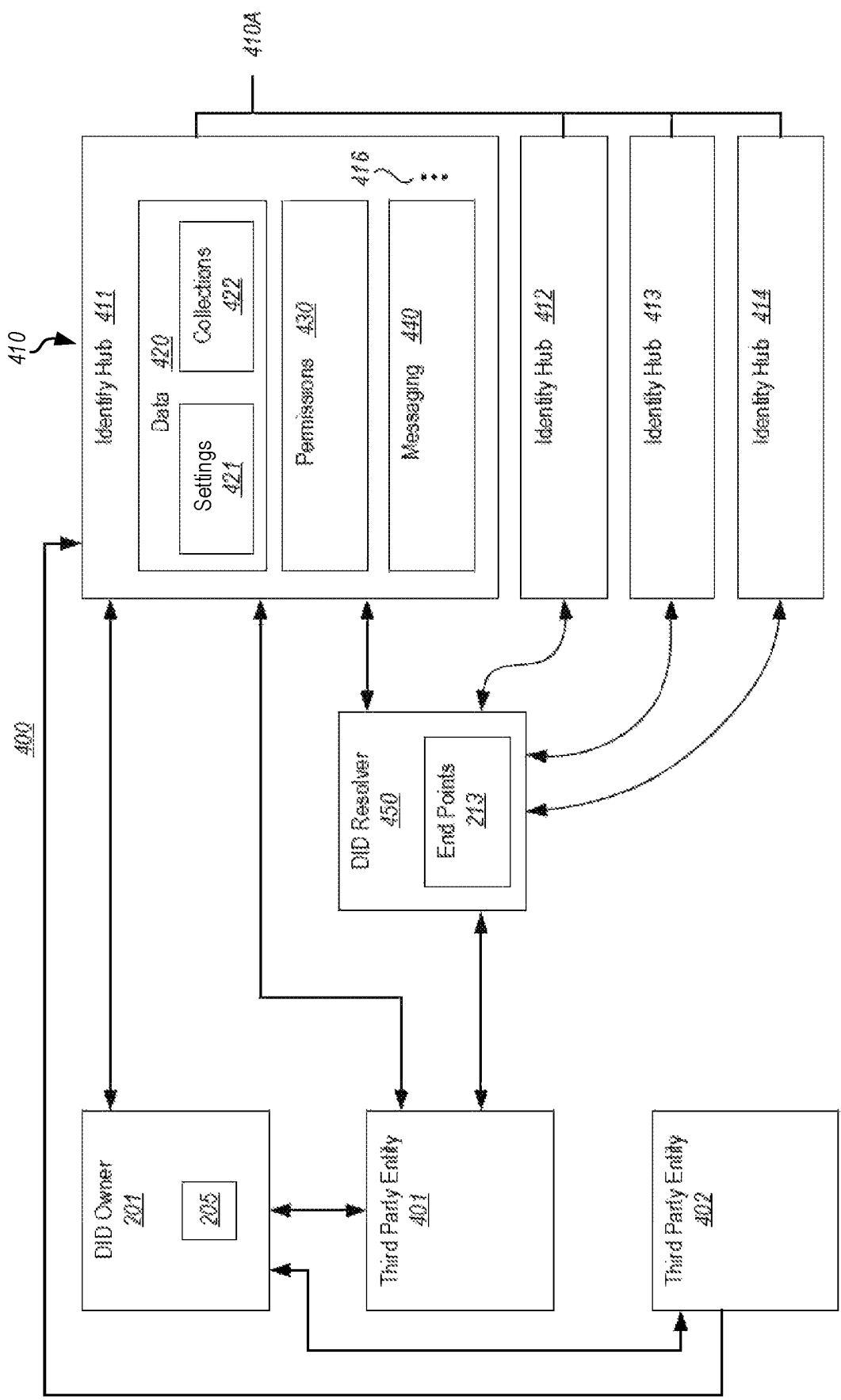
FIG. 4 illustrates an example decentralized storage device or identity hubs.

FIG. 4 illustrates an embodiment of a computing system environment 400 in which a DID such as DID 205 is utilized. Specifically, the environment 400 is used to describe the use of the DID 205 in relation to one or more decentralized stores or identity hubs 410 that are each under the control of the DID owner 201 to store data belonging to or regarding the DID owner 201. For instance, data is stored within the identity hubs using the storage module 380 of FIG. 3. It will be noted that FIG. 4 includes references to elements first discussed in relation to FIG. 2 or 3 and thus uses the same reference numeral for ease of explanation.

In one embodiment, the identity hubs 410 is multiple instances of the same identity hub. This is represented by the line 410A. Thus, the various identity hubs 410 include at least some of the same data and services. Accordingly, if a change is made to part of at least some of the data (and potentially any part of any of the data) in one of the identity hubs 410, the change is reflected in one or more of (and perhaps all of) the remaining identity hubs.

The identity hubs 410 may be any data store that is in the exclusive control of the DID owner 201. As an example only, the first identity hub 411 and second identity hub 412 are implemented in cloud storage (perhaps within the same cloud, or even on different clouds managed by different cloud providers) and thus are able to hold a large amount of data. Accordingly, a full set of the data is storable in these identity hubs.

However, the identity hubs 413 and 414 may have less memory space. Accordingly, in these identity hubs a descriptor of the data stored in the first and second identity hubs is included. Alternatively, a record of changes made to the data in other identity hubs is included. Thus, changes in one of the identity hubs 410 are either fully replicated in the other identity hubs or at least a record or descriptor of that data is recorded in the other identity hubs.

Because the identity hubs are multiple instances of the same identity hub, only a full description of the first identity hub 411 will be provided as this description also applies to the identity hubs 412 through 414. As illustrated, identity hub 411 includes data storage 420. The data storage 420 is used to store any type of data that is associated with the DID owner 201. In one embodiment the data is a collection 422 of a specific type of data corresponding to a specific protocol. For example, the collection 422 may be medical records data that corresponds to a specific protocol for medical data. The collection 422 also includes other types of data, such as attestations 215 made by or about the DID owner 201.

In one embodiment, the stored data has different authentication and privacy settings 421 associated with the stored data. For example, a first subset of the data has a setting 421 that allows the data to be publicly exposed, but that does not include any authentication to the DID owner 201. This type of data is typically for relatively unimportant data such as color schemes and the like. A second subset of the data has a setting 421 that allows the data to be publicly exposed and that includes authentication to the DID owner 201. A third subset of the data has a setting 421 that encrypts the subset of data with the private key 206 and public key 207 pair (or some other key pair) associated with the DID owner 201. This type of data will require a party to have access to the public key 207 (or to some other associated public key) in order to decrypt the data. This process also includes authentication to the DID owner 201. A fourth subset of the data has a setting 421 that restricts this data to a subset of third parties. This requires that public keys associated with the subset of third parties be used to decrypt the data. For example, the DID owner 201 causes the setting 421 to specify that only public keys associated with friends of the DID owner 201 are able to decrypt this data. With respect to data stored by the storage module 380, these settings 411 are at least partially composed by the storage module 380 of FIG. 3.

In some embodiments, the identity hub 411 has a permissions module 430 that allows the DID owner 201 to set specific authorization or permissions for third parties such as third parties 401 and 402 to access the identity hub. For example, the DID owner 201 provides access permission to his or her spouse to all the data 420. Alternatively, the DID owner 201 allows access to his or her doctor for any medical records. It will be appreciated that the DID owner 201 is able to give permission to any number of third parties to access a subset of the data 420. This will be explained in more detail to follow. With respect to data stored by the storage module 380, these access permissions 430 are at least partially composed by the storage module 380 of FIG. 3.

The identity hub 411 also include a messaging module 440. In operation, the messaging module allows the identity hub to receive messages such as requests from parties such as third parties 401 and 402 to access the data and services of the identity hub. In addition, the messaging module 440 allows the identity hub 411 to respond to the messages from the third parties and to also communicate with a DID resolver 450. This will be explained in more detail to follow. The ellipsis 416 represents that the identity hub 411 may have additional services as circumstances warrant.

In one embodiment, the DID owner 201 wishes to authenticate a new device 301 with the identity hub 411 that is already associated with the DID 205 in the manner previously described. Accordingly, the DID owner 201 utilizes the DID management module 320 associated with the new user device 301 to send a message to the identity hub 411 asserting that the new user device is associated with the DID 205 of the DID owner 201.

However, the identity hub 411 is not able to initially recognize the new device as being owned by the DID owner 201. Accordingly, the identity hub 411 uses the messaging module 440 to contact the DID resolver 450. The message sent to the DID resolver 450 includes the DID 205.

The DID resolver 450 is a service, application, or module that is configured in operation to search the distributed ledger 220 for DID documents associated with DIDs. Accordingly, in the embodiment the DID resolver 450 searches the distributed ledger 220 using the DID 205, which should result in the DID resolver 450 finding the DID document 210. The DID document 210 is then provided to the identity hub 411.

As discussed previously, the DID document 210 includes a public key 208 or 209 that is associated with the new user device 301. To verify that the new user device is owned by the DID owner 201, the identity hub 411 provides a cryptographic challenge to the new user device 301 using the messaging module 440. This cryptographic challenge is structured such that only a device having access to the private key 206 will be able to successfully answer the challenge.

In this embodiment, since the new user device is owned by DID owner 201 and thus has access to the private key 206, the challenge is successfully answered. The identity hub 411 then records in the permissions 430 that the new user device 301 is able to access the data and services of the identity hub 411 and also the rest of the identity hubs 410.

It will be noted that this process of authenticating the new user device 301 was performed without the need for the DID owner 201 to provide any username, password or the like to the provider of the identity hub 411 (i.e., the first cloud storage provider) before the identity hub 411 could be accessed. Rather, the access was determined in a decentralized manner based on the DID 205, the DID document 210, and the associated public and private keys. Since these were at all times in the control of the DID owner 201, the provider of the identity hub 411 was not involved and thus has no knowledge of the transaction or of any personal information of the DID owner 201.

In another example embodiment, the DID owner 201 provides the DID 205 to the third-party entity 401 so that the third-party is able to access data or services stored on the identity hub 411. For example, the DID owner 201 is a human who is at a scientific conference who desires to allow the third-party 401, who is also a human, access to his or her research data. Accordingly, the DID owner 201 provides the DID 205 to the third-party 401.

Once the third-party 401 has access to the DID 205, he or she accesses the DID resolver 450 to access the DID document 210. As previously discussed, the DID document 210 includes an end point 213 that is an address or pointer to services associated with the decentralized identity.

Completing the research data example, the third-party 401 sends a message to the messaging module 440 asking for permission to access the research data. The messaging module 440 sends a message to the DID owner 201 asking if the third-party 401 should be given access to the research data. Because the DID owner desires to provide access to this data, the DID owner 201 allows permission to the third-party 401 and this permission is recorded in the permissions 430.

The messaging module 440 then messages the third-party 401 informing the third-party that he or she is able to access the research data. The identity hub 411 and the third-party 401 directly communicate so that the third-party is able to access the data. It will be noted that in many cases, it will actually be an identity hub associated with the third-party 401 that communicates with the identity hub 411. However, it may be a device of the third-party 401 that does the communication.

Advantageously, the above described process allows the identity hub 411 and the third-party 401 to communicate and to share the data without the need for the third-party to access the identity hub 411 in the conventional manner. Rather, the communication is provisioned in the decentralized manner using the DID 205 and the DID document 210. This advantageously allows the DID owner to be in full control of the process.

As shown in FIG. 4, the third-party 402 also requests permission for access to the identity hub 411 using the DID 205 and the DID document 210. Accordingly, the embodiments disclosed herein allow access to any number of third parties to the identity hubs 410.

Example Recovery Mechanisms

Figure 5:
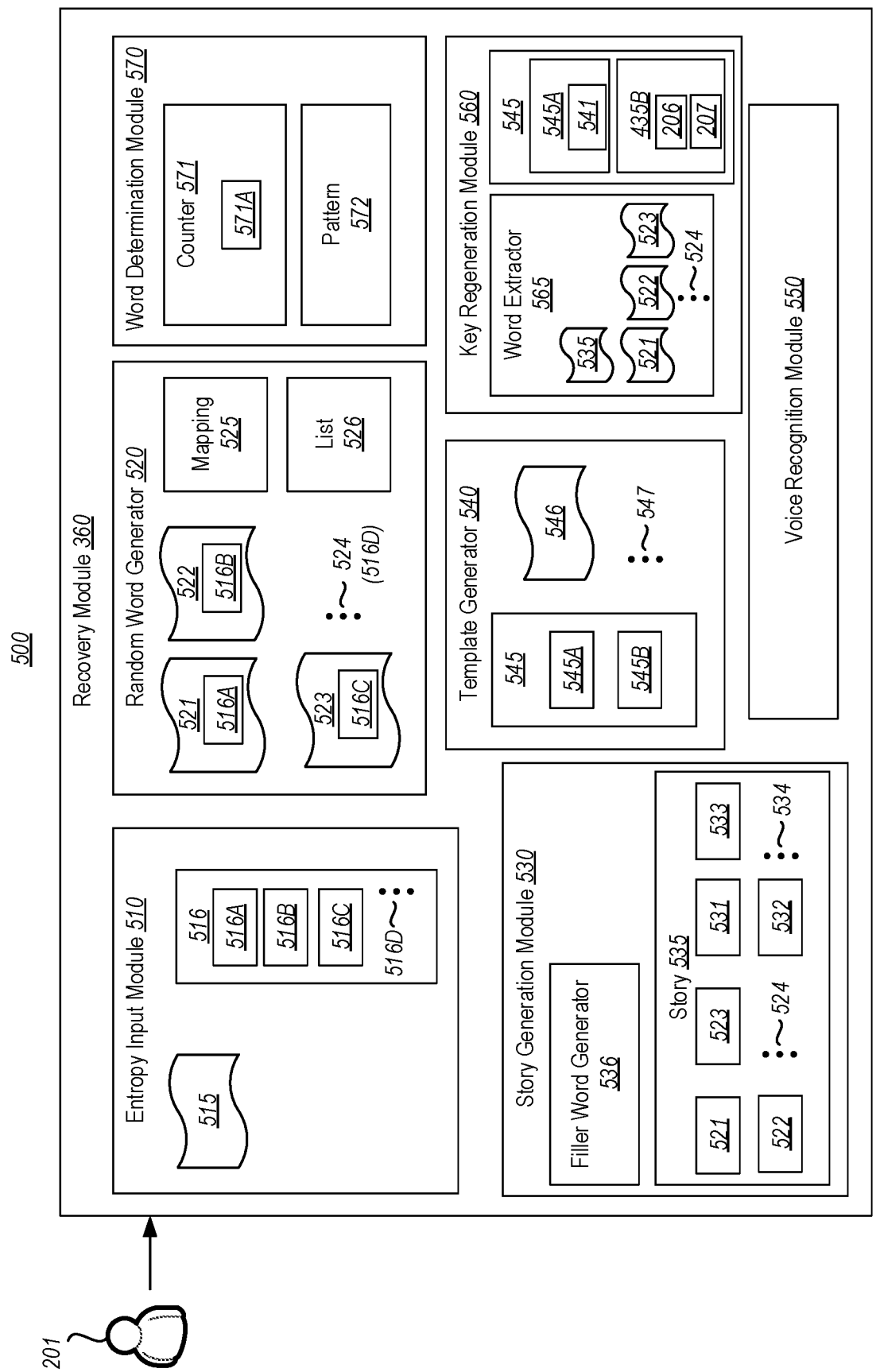
FIG. 5 illustrates an example of a recovery mechanism that is able to recover a private key.

Attention is now made to FIG. 5, which illustrates one embodiment of a recovery mechanism 365 that utilizes the recovery module 360. In the embodiment, the recovery mechanism is based on random (i.e., unrelated) words that are generated and are then combined to generate a story, a paragraph, a sentence or the like that is easier for a DID owner 201 to remember than if the random words were not combined. Unlike some conventional recovery mechanisms that generate random words that are unrelated to each other, the current embodiment uses random words that are related to each by being part of the generated story, paragraph, or sentence. Advantageously, the DID owner 201 need not remember the unrelated words or have to store them in a separate location (although he or she could) where they may be accessed by a hostile third party. Instead, the DID owner 201 need only remember the generated story, paragraph, or sentence (or at least a sufficient portion of the generated story, paragraph, or sentence) and the recovery mechanism will determine the random words from the input memory. This process will be described in more detail to follow.

As illustrated, the recovery module 360 includes an entropy input module 510. In operation, the DID owner 201 uses the entropy input module 510 to input or otherwise specify a desired level of entropy 515 for a private key recovery seed as will be explained in more detail to follow. The levels of entropy that the DID owner 201 selects are typically a random sequence of 128-256 bits to generate 12-24 random words. Of course, other levels entropy may also be selected. Accordingly, the embodiments disclosed herein are not limited by the level of entropy that is selected.

It will be appreciated that at a higher the level of entropy security is increased, but the number of generated random words is increased. Once the desired level of entropy has been specified, the entropy input module 510 generates a random sequence of bits 516 that correspond to the specified level of entropy. For example, if the specified level is 128 bits, then the entropy input module 510 generates a random sequence of bits 516 that comprises 128 bits. In operation, the entropy input module 510 also generates a checksum value, typically 4 bits in length, that is added to the random generated sequence of bits 516.

The entropy input module 510 then divides the random sequence of bits 216 into various segments based on the total amount of bits. For example, if the random generated sequence of bits 516 is 128 bits and the checksum value is 4 bits, then the total amount of bits would be 132 bits. The entropy input module 510 would divide the 132 bits into 12 segments of 11 bits each. As illustrated, the random generated sequence of bits 516 is divided into a first segment 516a, a second segment 516b, a third segment 516c, and any number of additional segments as illustrated by the ellipses 516d. In the embodiment implementing 12 segments, the ellipses 516d represents segments 4-12.

The recovery module 360 also includes a random word generator 520. In operation, the random word generator 520 generates specific random words 521, 522, 523, and any number of additional random words as illustrated by ellipses 524 based on the specified level of entropy 515. For example, as mentioned above if the specified level of entropy 515 is 128 bits, then the random word generator 520 will generate 12 specific random words. Alternatively, if the specified level of entropy 515 is 256 bits, then the random word generator 520 will generate 24 specific random words. It will be noted that the generated specific random words 521-524 are considered "random" since they may be any reasonable word from the native language of the DID owner 201 or from another language that the DID owner 201 is familiar with and do not have to have any connection to each other. In some embodiments, the generated specific random words 521-524 may be selected from a list 526 that is accessible to the random word generator 520. In other embodiments, the random word generator 520 may generate the random words without the use of the list 526 by using a dictionary or the like in the desired language. For example, in the disclosed embodiment the specific random word 521 may be "married", the specific random word 522 may be "summer", the specific random word 523 may be "ceremony", and the additional random words 524 may be words such as "restaurant", "reception", and "cake".

The random word generator 520 then maps or otherwise associates each of the segments 516a-516d with a specific random word 521-524 as represented by mapping 525. For instance, the first segment 516a is mapped to the specific random word 521, the second segment 516b is mapped to the specific random word 522, the third segment 516c is mapped to the random word 523, and so on until all the remaining segments represented by the ellipses 516d have been mapped to specific random words represented by the ellipses 524. Thus, the random words 521-524 represent the segments of the random sequence of bits 516 (including the checksum value) and may be used in place of the random sequence of bits 516.

The recovery module 360 also includes a story generation module 530. In operation, the story generation module 530 uses the generated random words 521-524 to generate a story, a paragraph, a sentence or the like 535 (hereinafter referred to as story 535 for ease of explanation) that should be easy for the DID owner 201 to remember. Thus, the embodiments disclosed herein are not limited by length or the content of the generated story 535. It will be noted that the story generation module 530 implements aspects of machine learning and the like, which enable the module to understand which additional words are needed to connect the generated random words into the story 535.

Accordingly, the story generation module 530 includes a filler word generator 536. In operation, the filler word generator 536 generates a series of filler words that are used to connect the generated random words 521-524 into the story 535. For example, the filler word generator 536 may generate a first filler word 531, a second filler word 532, a third filler word 533, and any number of additional filler words as needed as illustrated by ellipses 534. It will be noted that the filler words comprise words of the story 535 that are not mapped to any of the segments 516a-516d and whose number is not based on the indicated entropy level. In other words, the filler word generator 536 combines the random words 521-524 and any number of needed filler words 531-534 into the story 535 that is understandable and memorizable by the DID owner 201.

An example of the operation of the story generation module 530 will now be explained. It will be noted that this example will use less than the typical 12 or 24 generated random words for ease of explanation, but that in operation 12 or 24 (or any other desired number) random words would be included in the story 535. Suppose that the random words 521-524 are "married", "summer", "ceremony", "restaurant", "reception", and "cake" as discussed above. Accordingly, the filler word generator 536 generates a story 535 that reads "I got married on a hot summer day in Tahoe. After the ceremony, we walked up from the beach the restaurant we had the reception at. My wife's aunt made our wedding cake" by generating filler words 531-534 sufficient to make the random words "married", "summer", "ceremony", "restaurant", "reception", and "cake" into the story 535. Thus, the word "I" could correspond to filler word 531, the word "got" could correspond to the filler word 532, the word "on" could correspond to the filler word 533, and the remaining words of the story 535 that are not the generated random words could correspond to the additional filler words 534. The story 535, in addition to the generated random words 521-524 can then be provided to the DID owner 201 using an interface of the user device 301 hosting the management module 320.

Advantageously, the DID owner 201 does not need to remember the random words 521-524 individually, which may be difficult. In addition, the DID owner does not need to write down and store the random words 521-524 individually in a storage location that might become comprised by a hostile third party. Rather, the DID owner 201 can simply memorize the story 535. In addition, or alternatively, the DID owner 201 can write down and store the story 535. Since the story 535 includes at least some of the additional filler words 531-534, a hostile third party should not be able to determine from the story 535 which words are the random words 521-524 that are mapped to the random sequence of bits 516 and thus can be used to comprise a private key and which words are filler words 531-534. This provides a technical advantage over conventional systems that require a user to remember or at least record the random generated words since they are not typically related to each other in any meaningful way.

The recovery module 360 also includes a template generator 540. In operation, the template generator 540 receives the random words 521-524 that have been mapped to the random sequence of bits 416. The template generator 540 then generates a template 545 that provides a first private key recovery mechanism 545A that will use the mapped random words 521-524 to generate a private key recovery seed 541. The first private key recovery mechanism 545A may be a key stretching function or some other like function that is able to generate the private key recovery seed 541 based on the random sequence of bits 516 that is represented by the random words 521-524. The template 545 also defines a second private key recovery mechanism 545B that uses the private key recovery seed 541 as an input to then regenerate the master private key 206. The second private key recovery mechanism 545B may be a function such as the HMAC-SHA512 algorithm or like algorithm that is able to regenerate the private key 206 based on the private key recovery seed 441 as an input. Although both the first and second private key recovery mechanisms 545A and 545B are shown as being in the same template, this need not always be the case. In some embodiments, the recovery mechanisms 545A and 545B may be included in separate templates as circumstances warrant.

In some embodiments, the template 545 is stored in a secure storage, such as the database 305. Alternatively, the template 545 is hosted by a third party such as the provider of the DID management module 320. In such embodiments, the DID owner 201 uses the recovery module 360 to access the secure storage or the third party to retrieve the template 545.

In other embodiments, the DID owner 201 may desire to generate additional templates and to store the additional templates in various locations for additional security. Accordingly, the template generator 540 is able to generate an additional template 546 and any number of additional templates as illustrated by the ellipses 547. The additional templates 546 and 547 may include the same information as the template 545. Alternatively, they may include different information as circumstances warrant.

The recovery module 360 includes a key regeneration module 560 that in operation is used to regenerate the private key 206. The key regeneration module 560 includes a word extractor 565. When the DID owner 201 desires to restore the private key 206, because the private key 206 has been lost, corrupted, or for any other reason, the DID owner 201 inputs or otherwise provides, perhaps using an interface of the user device 301, the story 535 to the key regeneration module 560. The word extractor 565 parses the input story 535 to extract those words of the story that correspond to the random words 521-524. Since the DID owner 201 is likely to remember the story 535, the word extractor 565 should be able to extract the random words 521-524 from the story 535. As mentioned previously, this is a technical advantage as the DID owner 201 only needs to enter the story 535 and does not need to remember any random words individually. As long as the story 535 is correctly input, the word extractor 565 will be able to extract the random words 521-524 that were previously generated. Of course, if the DID owner 201 has stored the random words 521-524 by themselves, then he or she could simply input these into the key generation module 560 instead of the story 535.

The key generation module 560 also accesses the template 545 that was previously generated from the location where the template is stored. The key generation module 560 uses the first private key recovery mechanism 545A and the extracted random words 521-524 to generate the private key recovery seed 541. The private key recovery seed 541, in one embodiment, may be a 512 bit random value. It will be appreciated that the embodiments disclosed herein are not limited by the type of private key recovery seed 541 that is generated in the manner described herein.

The key generation module 560 uses the second private key recovery mechanism 545B and the private key recovery seed 541 to regenerate the private key 206. That is, the second private key recovery mechanism 545B takes the private key recovery seed 541 as an input. The second private key recovery mechanism 545B then performs its specified operation on the private key recovery seed 541 to recover the private key 206. Once the private key 206 is recovered, the public key 207 (and any number of additional public keys) may be recovered based on the recovered private key 206.

In some embodiments, the recovery module 360 includes further security measures that help to ensure that it is the DID owner 201 that is attempting to restore the private key 206 using the story 535. For example, there may be a situation where a hostile third party has in some manner obtained the story 535. In such situations, the hostile third party may be able to use the story 535 to gain access to the private key 206. Accordingly, in some embodiments the recovery module 360 includes a voice recognition module 550. In such embodiments, the recovery module 360 requires that the DID owner 201 record the story 535 by speaking the story at the time the story is generated by the story generation module 530, perhaps using a microphone of the user device 301. At such time as the DID owner 201 desires to restore the private key 206, he or she may speak the story 535 into the recovery module 360 using the microphone of the user device 301. The voice recognition module 550 determines if the voice that is speaking the story 535 matches the voice that initially recorded the story 535. If a match is determined, then the voice recognition module 550 allows the word extractor 565 and the key regeneration module 560 to generate the private key recovery seed 541 and regenerate the private key 206 in the manner previously described.

In some instances, when the DID owner 201 desires to restore the private key 206, he or she may not input the story 535 exactly as it was generated by the story generation module 530. For example, the DID owner 201 may only enter a partial version of the story 535 and may thus leave out portions of the story that include one or more of the random words 521-524 and that are mapped to the random sequence of bits 516. In such instances, this may result in the private key recovery seed 541 not being generated and subsequently the private key 206 not being restored.

Accordingly, in some embodiments the recovery module 360 includes a word determination module 570. The word determination module 570 includes a word counter 571. In operation, the word counter 571 parses the input story 535 when the story is input to restore the private key 206 after the word extractor 565 has extracted the words that correspond to the random words 521-524. The word counter 571 then counts the number of words from the story 535 that match the random words 521-524. If all the words are present, then the process may be allowed to continue. However, if the DID owner 201 only entered a partial version of the story 535, the word counter 571 would not be able to count all the words that match all of the random words 521-524. In such instances, the word counter 571 determines how many of the words were entered and if this is a sufficient number. For example, the word counter 571 may access a threshold 571A that specifies a sufficient number of words that should be entered as part of story 535 when recovering the private key 206 when not all of the words are entered. If a sufficient number is found, then the recovery module 380 may provide any of the random words 521-524 that were not included in the partial version of the story 535 so that the required random words 521-524 are available as an input to the mechanism 545A to generate the private key recovery seed 541. As mentioned above, a mapping 525 between the random words 521-524 and the segments of the random bit sequence 516 is made. This mapping is used to determine those random words that are not extracted from the story 535 input to recover the private key 206. Of course, if the word counter 571 does not find a sufficient number of words from the partial version of the story 535 that match the random words 521-524, the process will not be allowed to continue. Since the DID owner 201 is likely to at least remember most of the story 535 and therefore input a large portion of the story 535, any time the word counter 571 does not find a sufficient number of words from the partial version of the story 535 that match the random words 521-524 it likely shows that it is not the DID owner 201 who is inputting the story 535.

A specific example will now be explained. Suppose that 12 random words 521-524 are included in the story 535. Further suppose that the DID owner 201 only input a partial version of the story 535 that includes nine of the random words 521-524. In this example, the word counter 571 will only count that nine of the random words are included in the partial version of the story 535. The word counter 571 then determines, by accessing the threshold 571A, if nine is a sufficient number. If nine is a sufficient number, those random words 521-524 not included in the partial version of the story will be provided for use in generating the seed 541 along the random words included in the partial version of the story. If nine is not a sufficient number of random words, then the private key 206 will not be recovered.

As mentioned previously, there may be instances where a hostile third party has obtained the story 535 (or at least a close approximation of the story) and attempts to use the story 535 to generate the private key 206 in the manner previously described. To help protect against this, in some embodiments the word determination module 570 includes a pattern module 572. In operation, the pattern module 572 analyzes the pattern of the input story 535 when it is initially generated. The pattern module 572 the analyzes the pattern of the story 535 that is input to recover the private key 206. The pattern module 572 may look for such patterns as differences in sentence structure, such as length of sentences, where words are placed in sentences, and time in between entering the sentences and/or words if the story 535 is spoken when being entered. The pattern module 572 also determines the order of the sentences of the story 535. The pattern module 572 then compares the various patterns from when the story 535 is input the second time to recover the private key 206 with the initial time the story 535 was generated. If the patterns are sufficiently close, then the pattern module 572 may infer that it is the DID owner 201 who is entering the story 535. However, if the patterns are sufficiently different, then the pattern module 572 may infer that that it is a different entity than the DID owner 201 who is attempting to use the story 535 to recover the private key 206.

Figure 6:
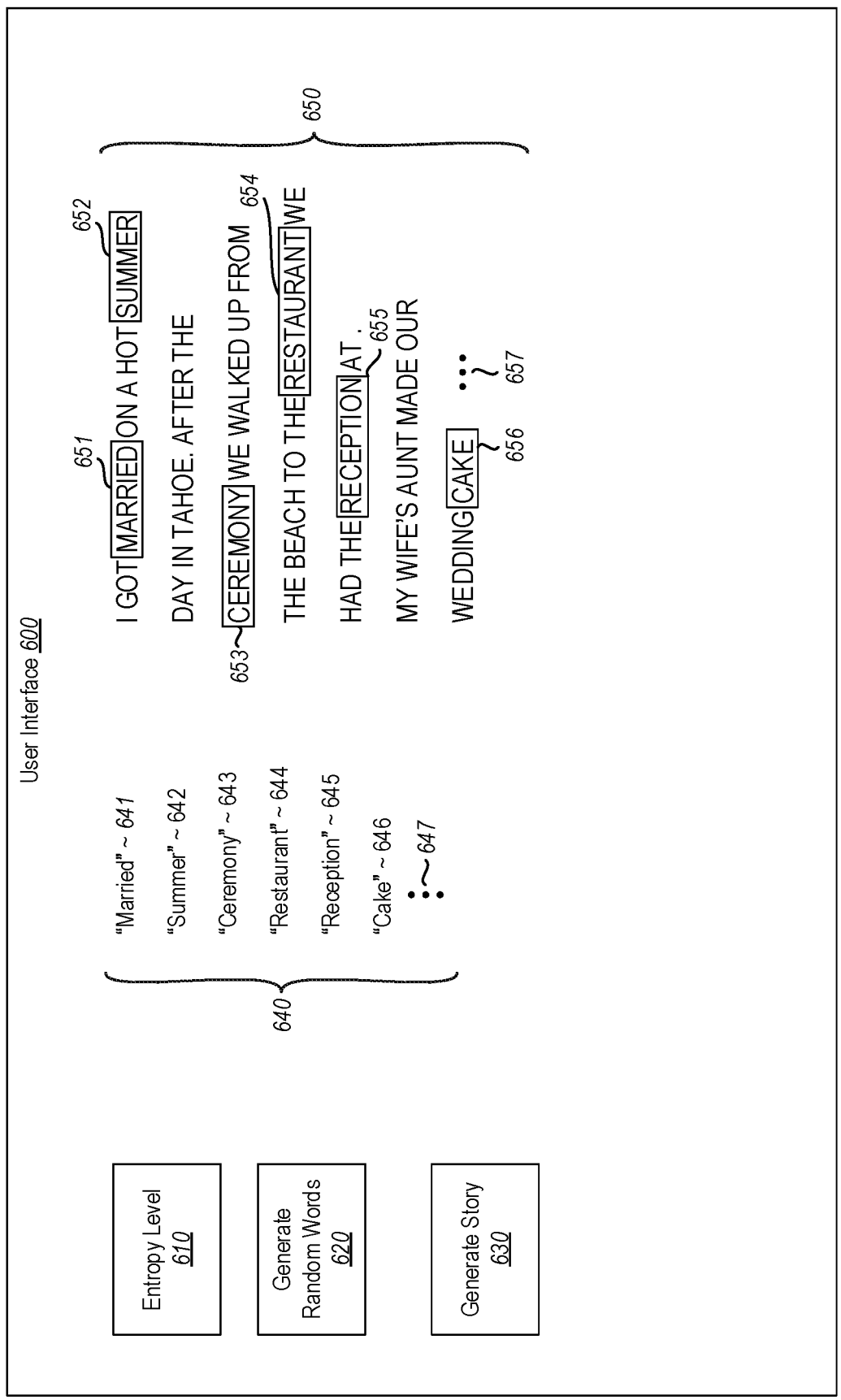
FIG. 6 illustrates an example of a User Interface that is used to recover a private key.

FIG. 6 illustrates a user interface (UI) 600 for displaying various aspects of the embodiments disclosed herein for recovering the private key 206. The UI 600 may be displayed on the user device 301, the web browser 302, or some other computing system associated with the DID owner 201. As illustrated, the UI 600 includes a UI element 610 that is used by the DID owner 201 to input the desired entropy level. In operation, the DID owner 201 activates the UI element 610 and is then prompted to enter the desired entropy level.

The UI 600 includes a UI element 620 that is used by the DID owner 201 to initiate the generation of the random words 521-524. In operation, the DID owner 201 activates the UI element 620. This causes the computing system to generate the random sequence of bits 516 and the segments 516a-516d and then map the segments to the various random words.

In some embodiments, the UI 600 displays the generated random words as shown at 640. For example, the UI 600 displays the random words "married" 641, "summer" 642, "ceremony" 643, "restaurant" 644, "reception" 645, and "cake" 646. The ellipses represent that any remaining non-illustrated random words may also be displayed. The DID owner 201 is able to see generated random words and record them if desired.

The UI 600 also includes a UI element 630 that is used by the DID owner 201 to initiate the generation of the story 535. In operation, the DID owner 201 activates the UI element 630. This causes the story generation module to generate the filler words 531-534 that connect the generated random words into the story 535.

The UI 600 displays the generated story 630 as shown at 650. In some embodiments, the UI 600 marks words 521-524 included in the story in a manner that is easily distinguishable from the filler words included in the story. In the illustrated embodiment, the UI 600 puts a box around the random words. For example, "married" is marked by box 651, "summer" is marked by box 652, "ceremony" is marked by box 653, "restaurant" is marked by box 654, "reception" is marked by box 655, and "cake" is marked by box 656. The ellipses 657 represent that the remaining non-illustrated may also be marked. It will be noted that marking by a box is only one of countless other ways that the random words could be marked. For example, the random words could have a different color or font or could be bolded or italicized. Thus, the embodiments disclosed herein are not limited by the way the random words are marked by the UI 600. By marking the random words when displaying the story 535, the UI 600 allows the DID owner 201 to know which words in the story correspond to the random words needed to recover the private key 206. The DID owner is able to write down and store the story 535 and/or memorize the story as needed.

The UI 600 further includes a UI element 660 that is used by the DID owner 201 to enter the story 535 when attempting to recover the private key 206. In operation, the DID owner 201 activates the UI element 660, which prompts the DID owner to enter either the random words 521-524 or to enter the story 535. Once these are entered, the computing system is able to extract the random words, generate the private key recovery seed 541, and recover the private key 206 as previously described.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
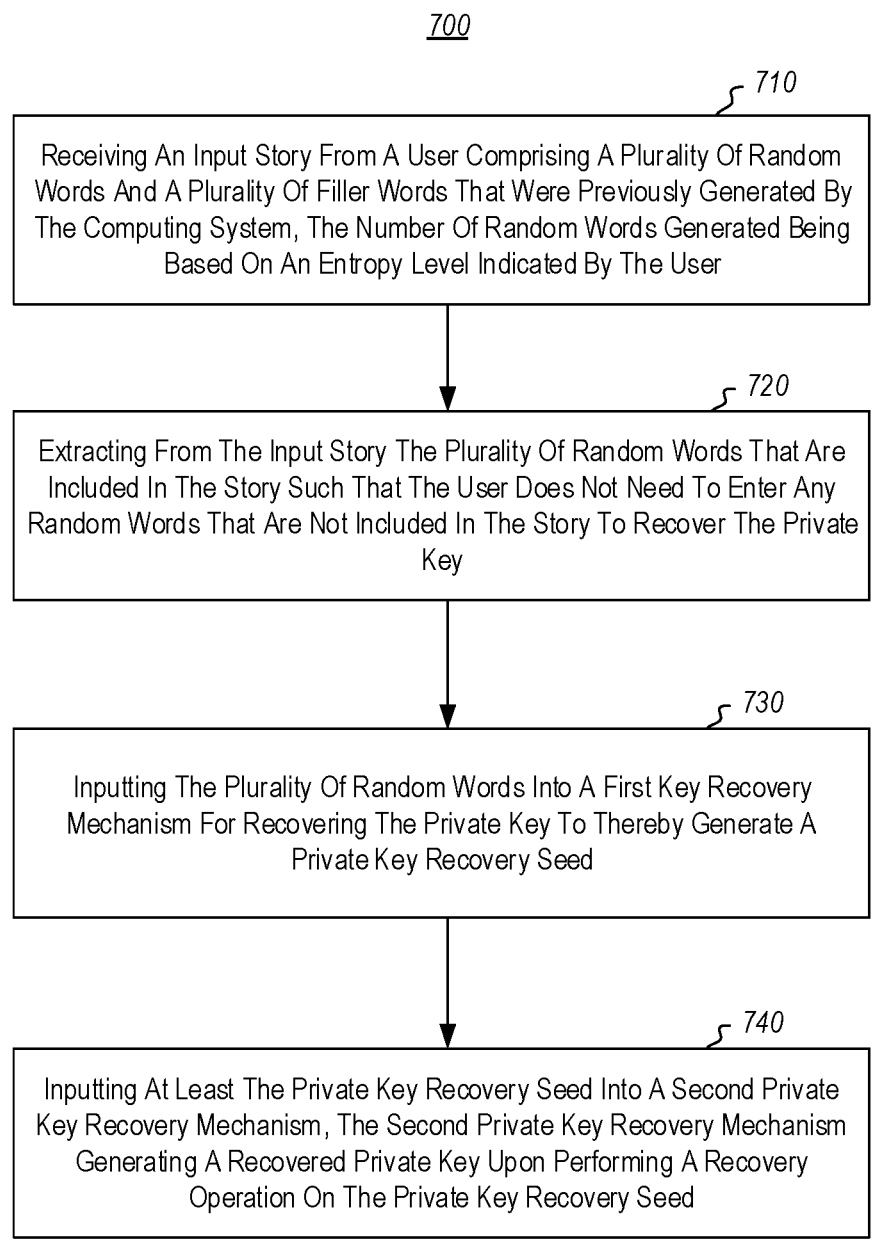
FIG. 7 illustrates a flow chart of an example method for generating a private key recovery seed based on random words extracted from generated story and for using the private key recovery seed to recover the private key.

FIG. 7 illustrates a flow chart of an example method 700 for generating a private key recovery seed based on random words extracted from generated story and for using the private key recovery seed to recover the private key. The method 700 will be described with respect to one or more of FIGS. 2-6 discussed previously.

The method 700 includes receiving an input from a user, the input being a story comprising a plurality of random words and a plurality of filler words that were previously generated by the computing system, the number of random words generated being based on an entropy level indicated by the user (710). For example, as previously described, the DID owner 201 inputs the story 535 into the recovery module 360. The story 365 includes both the random words 521-524 and the filler words 531-534. As described above, the random words are based on the entropy level 515. Based on the entropy level the sequence of random bits 516 is generated, divided into the various segments 516A-516D, and then mapped to generated random words.

The method 700 includes extracting from the input story the plurality of random words that are included in the story such that the user does not need to enter any random words that are not included in the story to recover the private key (720). For example, as previously described the word extractor 565 of the key regeneration module 560 extracts the random words 521-524 from the story 535. As discussed, the DID owner 201 does not need to enter the random words individually, but need only enter the story 535 to recover the private key 206.

The method 700 includes inputting the plurality of random words into a first key recovery mechanism for recovering the private key to thereby generate a private key recovery seed (730). For example, as previously described the random words 521-524 that were extracted from the story 535 are input into the first key recovery mechanism 545A to generate the private key recovery seed 541.

The method 700 includes inputting at least the private key recovery seed into a second private key recovery mechanism, the second private key recovery mechanism generating a recovered private key upon performing a recovery operation on the private key recovery seed (740). For example, as previously described the private key recovery seed 541 is input into the second key recovery mechanism 545B to thereby generate a recovered private key 206. The recovered private key 206 can then be used to recover various public keys such as public key 207.

Figure 8:
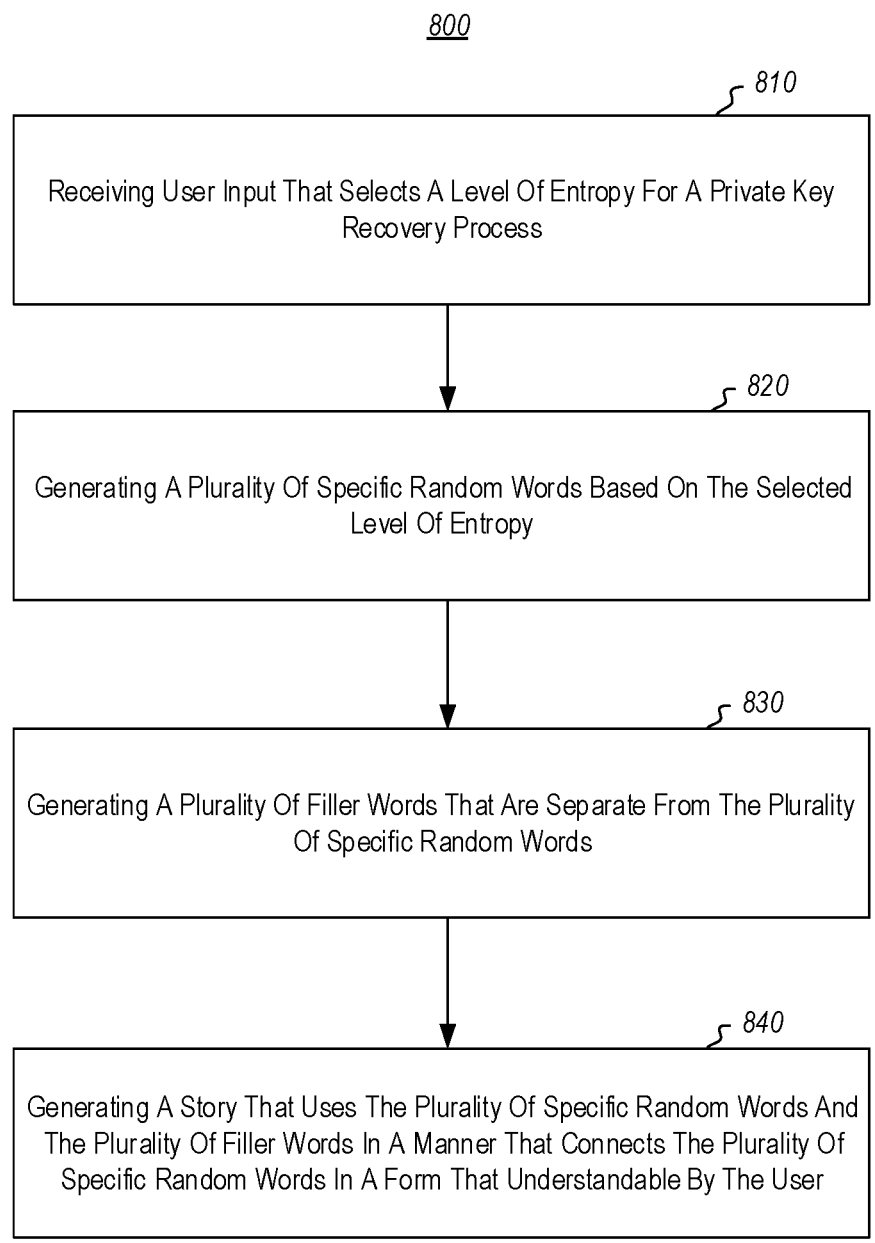
FIG. 8 illustrates a flow chart of an example method for generating a story including random words that can be used to generate a key recovery seed that is useable to recover a private key.

FIG. 8 illustrates a flow chart of an example method 800 for generating a story including random words that can be used to generate a key recovery seed that is useable to recover a private key. The method 800 will be described with respect to one or more of FIGS. 2-6 discussed previously.

The method 800 incudes receiving user input that selects a level of entropy for a private key recovery process (810). For example, as previously described the DID owner 201 uses the entropy input module 510 to enter a desired level of entropy, which is typically 128 or 256 bits.

The method 800 includes generating a plurality of specific random words based on the selected level of entropy (820). For example, as previously described specific random words 521-524 are selected. They may be selected from the list 526 or from a dictionary or the like by the computing system. The random words 521-524 are then mapped to segments 516a-516d of the sequence of bits 516. Thus, the random words 521-524 represent the mapped segments when entered into the recovery module 360 during a private key recovery process.

The method 800 includes generating a plurality of filler words that are separate from the plurality of specific random words (830). For example, as previously described the filler word generator 536 generates the filler words 531-534.

The method 800 includes generating a story that uses the plurality of specific random words and the plurality of filler words in a manner that connects the plurality of specific random words in a form that understandable by the user. For example, as previously described the story generation module 530 generates the story 535 using the random words 521-524 and the needed filler words 531-534. The story 535 connects the unrelated random words into a related form that is understandable by the DID owner 201. The story 535 may then be used to recover the private key 206 in the manner previously described.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system that is implemented in a decentralized network that implements a distributed ledger, the distributed ledger being configured to back one or more decentralized identities (DID) for one or more users of the computing system, the computing system providing a mechanism for generating a private key recovery seed based on random words extracted from a generated story and for using the private key recovery seed to recover the private key, the computing system comprising:
   one or more processors; and
   one or more computer-readable media having thereon computer-executable instructions that are structured such that, when executed by the one or more processors, cause the computing system to:
   receive an input story from a user comprising a plurality of random words and a plurality of filler words that were previously generated by the computing system, the number of random words generated being based on an entropy level indicated by the user;
   extract from the input story the plurality of random words that are included in the story such that the user does not need to enter any random words that are not included in the story to recover the private key;
   input the plurality of random words into a first key recovery mechanism for recovering the private key to thereby generate a private key recovery seed; and
   input at least the private key recovery seed into a second private key recovery mechanism, the second private key recovery mechanism generating a recovered private key upon performing a recovery operation on the private key recovery seed.

2. The computing system in accordance with claim 1, wherein generating the plurality of random words comprises:
   generating a sequence of random bits that represent the entropy level;
   dividing the sequence of random bits into a plurality of segments; and
   mapping each of the plurality of random words with a specific segment of the plurality of segments.

3. The computing system in accordance with claim 2, wherein the filler words comprise words of the story that are not mapped to any segments of the plurality of segments and whose number is not based on the indicated entropy level.

4. The computing system in accordance with claim 1, wherein the computer-executable instructions are structured to further cause the computing system to:
   generate one or more public keys based on the recovered private key.

5. The computing system in accordance with claim 1, wherein the computing system includes a voice recognition module and wherein the computer-executable instructions are structured to further cause the computing system to:
   receive the input story via the input story being spoken by the user into the computing system at a time the story is initially generated;
   receive the input story via the input story being spoken by the user into the computing system at the time the private key is to be recovered; and
   use the voice recognition module to compare the input story received from the user at the time the private key is to be recovered with the input story received at a time the story is initially generated to determine if there is a match of the user's voice,
   wherein the computing system only recovers the private key if there is a match of the user's voice.

6. The computing system in accordance with claim 1, wherein the computer-executable instructions are structured to further cause the computing system to:
   count the number of random words that are extracted from the input story; and
   determine if the number of extracted random words is at least equal to a predetermined threshold,
   wherein the computing system only recovers the private key if the number of extracted random words at least equals the predetermined threshold.

7. The computing system in accordance with claim 1, wherein the computer-executable instructions are structured to further cause the computing system to:
   analyze a first pattern of the input story at the time the story is generated;
   analyze a second pattern of the input story at the time the plurality of random words are extracted from the input; and
   compare the first and second patterns to determine if the patterns are substantially close to each other;
   wherein the computing system only recovers the private key if the first and second patterns are substantially close to each other.

8. A method for generating a private key recovery seed based on random words extracted from a generated story and for using the private key recovery seed to recover the private key, the method comprising:
   receiving an input story from a user comprising a plurality of random words and a plurality of filler words that were previously generated by the computing system, the number of random words generated being based on an entropy level indicated by the user;
   extracting from the input story the plurality of random words that are included in the story such that the user does not need to enter any random words that are not included in the story to recover the private key;
   inputting the plurality of random words into a first key recovery mechanism for recovering the private key to thereby generate a private key recovery seed; and inputting at least the private key recovery seed into a second private key recovery mechanism, the second private key recovery mechanism generating a recovered private key upon performing a recovery operation on the private key recovery seed.

9. The method in accordance with claim 8, further comprising:
generating a sequence of random bits;
dividing the sequence of random bits into a plurality of segments; and
mapping each of the plurality of random words with a specific segment of the plurality of segments.

10. The method in accordance with claim 9, wherein the filler words comprise words of the story that are not mapped to any segments of the plurality of segments and whose number is not based on the indicated entropy level.

11. The method in accordance with claim 8, further comprising:
generating one or more public keys based on the recovered private key.

12. The method in accordance with claim 8, further comprising:
receiving the input story via the input story being spoken by the user into the computing system at a time the story is initially generated;
receiving the input story via the input story being spoken by the user into the computing system at the time the private key is to be recovered; and
using the voice recognition module to compare the input story received from the user at the time the private key is to be recovered with the input story received at a time the story is initially generated to determine if there is a match of the user's voice,
wherein the computing system only recovers the private key if there is a match of the user's voice.

13. The method in accordance with claim 8, further comprising:
counting the number of random words that are extracted from the input story; and
determining if the number of extracted random words is at least equal to a predetermined threshold,
wherein the computing system only recovers the private key if the number of extracted random words at least equals the predetermined threshold.

14. The method in accordance with claim 8, further comprising: analyzing a first pattern of the input story at the time the story is generated;
analyzing a second pattern of the input story at the time the plurality of random words are extracted from the input; and
comparing the first and second patterns to determine if the patterns are substantially close to each other;
wherein the computing system only recovers the private key if the first and second patterns are substantially close to each other.

15. A computing system that is implemented in a decentralized network that implements a distributed ledger, the distributed ledger being configured to back one or more decentralized identities (DID) for one or more users of the computing system, the computing system providing a mechanism for generating a story including random words that can be used to generate a private key recovery seed that is useable to recover a private key, the computing system comprising:
one or more processors; and
one or more computer-readable media having thereon computer-executable instructions that are structured such that, when executed by the one or more processors, cause the computing system to:
receive user input that selects a level of entropy for a private key recovery process;
generate a plurality of specific random words based on the selected level of entropy;
generate a plurality of filler words that are separate from the plurality of specific random words; and
generate a story that uses the plurality of specific random words and the plurality of filler words in a manner that connects the plurality of specific random words in a form that understandable by the user.

16. The computing system in accordance with claim 15, wherein generating the plurality of random words comprises:
generating a sequence of random bits that are indicative of the selected level of entropy;
dividing the sequence of random bits into a plurality of segments; and
mapping each of the plurality of specific random words with a specific segment of the plurality of segments.

17. The computing system in accordance with claim 16, wherein the filler words comprise words of the generated story that are not mapped to any segments of the plurality of segments and whose number is not based on the selected entropy level.

18. The computing system in accordance with claim 15, further comprising a user interface element, the user interface element being configured to:
display a listing of the generated plurality of specific random words.

19. The computing system in accordance with claim 15, further comprising a user interface element, the user interface element being configured to:
display the generated story; and
mark the plurality of specific random words included in the story in a manner that is distinguishable from the filler words included in the story.

20. The computing system in accordance with claim 15, wherein the selected level of entropy in one of 128 bits or 256 bits.

* * * * *